United States Patent [19]

Partilla et al.

[11] Patent Number: 4,727,401

[45] Date of Patent: Feb. 23, 1988

[54] TWO-UP AUTOMATIC DOCUMENT FEEDER FOR SIMPLEX TO DUPLEX COPYING

[75] Inventors: Stephen R. Partilla, Webster; Ernest L. Dinatale, Rochester, both of N.Y.

[73] Assignee: Xerox Corporation, Stamford, Conn.

[21] Appl. No.: 912,014

[22] Filed: Sep. 26, 1986

[51] Int. Cl.$^4$ ............................................. G03G 15/00
[52] U.S. Cl. ............................ 355/14 SH; 355/3 SH; 355/24
[58] Field of Search ............... 355/3 R, 3 SH, 14 SH, 355/14 R, 23, 24, 25

[56] References Cited

U.S. PATENT DOCUMENTS

| | | | |
|---|---|---|---|
| H000021 | 2/1986 | Schieck | 355/14 SH |
| 3,635,555 | 1/1972 | Kurahashi et al. | 355/8 |
| 3,869,202 | 3/1975 | Tabata et al. | 355/3 R |
| 3,987,722 | 10/1976 | Goodwin | 101/91 |
| 4,017,173 | 4/1977 | Komori et al. | 355/8 |
| 4,043,665 | 8/1977 | Caldwell | 355/76 |
| 4,052,054 | 10/1979 | Cardwell et al. | 271/227 |
| 4,176,945 | 12/1979 | Holzhauser et al. | 355/23 |
| 4,179,215 | 12/1979 | Hage | 355/50 |
| 4,184,671 | 1/1980 | Sasamori | 271/18 |
| 4,235,431 | 11/1980 | Abrams et al. | 271/10 |
| 4,315,687 | 2/1982 | Breuers et al. | 355/75 |
| 4,334,765 | 6/1982 | Clark | 355/14 SH |
| 4,468,114 | 8/1984 | Pels et al. | 355/14 R |
| 4,469,319 | 9/1984 | Robb et al. | 271/3.1 |
| 4,544,148 | 10/1985 | Kitajima et al. | 271/3.1 |
| 4,579,444 | 4/1986 | Pinckney et al. | 355/14 SH |
| 4,592,651 | 6/1986 | Dikawa et al. | 355/72 |
| 4,595,187 | 6/1986 | Bober | 270/37 |
| 4,618,244 | 10/1986 | Watanabe | 355/8 |
| 4,634,265 | 1/1987 | Tada | 355/3 SH |
| 4,640,611 | 2/1987 | Ohdake et al. | 355/77 |
| 4,674,866 | 6/1987 | Tanaka | 355/23 |

FOREIGN PATENT DOCUMENTS

| | | | |
|---|---|---|---|
| 54-164764 | 12/1979 | Japan | 35/83 |
| 56-88155A | 7/1981 | Japan | 35/83 |
| 60-2942 | 1/1985 | Japan . | |

OTHER PUBLICATIONS

1985 Printed Operator's Manual for the Xerox Corp. "1090" Copier, pp 25-27.
Xerox Disclosure Journal, vol. 9 #5, Sep./Oct. 1984, "Copy rotator/Inverter", by R. E. Schaeffer at pp. 323-324.
"Separation and Sequencing to Achieve Reversion", Britt et al., Xerox Disclosure Journal, Jan./Feb. 1985, vol. 10, No. 1, pp. 45-49.

Primary Examiner—A. C. Prescott
Attorney, Agent, or Firm—Mark Costello

[57] ABSTRACT

Method and apparatus for advancing two simplex documents from an input stack to a copying platen, for making a desired number of duplex copies therefrom. A first simplex document is advanced to a registration position, a second simplex document is subsequently advanced to a registration position with respect to the first document, and the documents thus registered are moved simultaneously to a copying position for sequential copying, and subsequent to scanning the documents a desired number of times to produce a number of copies, are moved to an output.

17 Claims, 3 Drawing Figures

TWO-UP AUTOMATIC DOCUMENT FEEDER FOR SIMPLEX TO DUPLEX COPYING

This invention relates generally to document feeders for duplex reproduction machines and more particularly to a document feeder suitable for placing two simplex documents on a copying machine simultaneously for copying.

INCORPORATION BY REFERENCE

For the purpose of background information, U.S. patent application Ser. No. 814,827, filed Dec. 30, 1985 and assigned to the same assignee as the present application, is incorporated by reference herein. Additionally, for the purpose of background information, U.S. Pat. Nos. 4,043,665 to Caldwell providing background information on document feeders; 4,179,215 to Hage; 4,176,945 to Holzhauser et al; and 4,544,148 to Kitajima et al demonstrating use of sensors in the control of document feeders for placement of documents at copying positions; 3,869,202 to Tabata et al; 4,017,173 to Komori et al and 3,635,555 to Kurahashi, demonstrating two-up copying in a copier; and 4,468,114 to Pels et al and 4,579,444 to Pickney et al, demonstrating document handler control systems, are all herein incorporated by reference.

BACKGROUND OF THE INVENTION

In increasingly complex reproduction or copier machines, customers demand an ever increasing amount of options, while at the same time demanding lower cost and greater reliability. This is particularly true in the low copy volume copier market, where most copiers are sold. Until recently, small size has been achieved by leaving out features commonly found in larger, more expensive machines. Now, customers regularly demand the same features in smaller sizes and at lower cost.

Of particular interest in smaller copiers is the provision of duplex copying. Duplex copying, i.e. copying onto both sides of a single copy sheet, is a desirable feature for the reduction of quantities of paper, and the production of attractively reproduced materials. It is often possible and desirable to copy two documents (originals) having images only on a single side (simplex documents) onto both side of a single copy sheet (duplex copy). This is sometimes accomplished in post collation machines (machines having an copy sheet output into sorter bins, or without recirculating document handlers) by making a desired number of first side copies in a reproduction processor, passing the first side copies to a duplex tray for temporary storage, and subsequently inverting and refeeding the first side copies to the reproduction processor to receive second side image information thereon. This function has also been accomplished by allowing two documents to be manually placed on a copying machine platen in side-by-side closely spaced relationship (two-up), and sequentially scanning each document to produce copies thereof. The first side copy sheets are inverted and returned immediately to the reproduction processor to receive second side copy thereon. Scanning of the documents to provide light images from each document on the platen, may be accomplished by either a scanning platen, as described in U.S. Pat. No. 4,017,173 to Komori, or with scanning optics as described in United States Patent Application Ser. No. 814,827. Also described are arrangements for the return of copy sheets bearing first side copy to receive second side copy thereon.

U.S. patent application Ser. No. 814,827 also describes a trayless path arrangement, which allows two documents, manually placed on the platen, each to be sequentially scanned twice, thereby passing two first side documents through the trayless path and back to the reproduction processor to receive second side copy thereon. It will be appreciated that the trayless paper path is significantly more reliable and somewhat faster than a path requiring refeeding from a duplex tray. Accordingly, it would be desirable to make maximum use of this capability by providing an automatic document feeder which provides both documents in appropriate position for scanning each sequentially.

SUMMARY OF THE INVENTION

In accordance with the present invention there is provided an automatic document feeder for feeding documents to be copied across the platen of a reproduction machine, particularly adaptable for advancing two documents onto the platen at the same in spaced side-by-side relationship, whereby each document may be scanned separately to provide simplex to duplex style copying.

In accordance with another aspect of the invention, an automatic document feeder advances a first document to a first registration position with respect to the platen, a second document to a second registration position with respect to said first document position, simultaneously advances first and second documents to a copying position for scanning of each document, and, subsequent to copying, simultaneously advances both documents to an output.

In accordance with yet another aspect of the invention, an automatic document feeder advances a first document to a first registration position with respect to the platen, a second document to a second registration position with respect to the first document, whereupon during advancement of the second document at constant speed to the second registration position with respect the first document, the first document is accelerated to a constant speed, during which acceleration, the second document reaches registration with respect to said first document. The two documents advance to a copying position for scanning of each document, and subsequent to copying, are advanced simultaneously to an output.

In accordance with yet another aspect of the invention, an automatic document feeder is provided with a document input tray for receiving a stack of documents to be copied, a stack feeder for feeding documents from the document stack to a paper path, a first stepper motor driving a set of nip rolls for advancing documents to a wide friction belt platen transport, a second stepper motor for driving the wide friction belt platen transport to advance documents across the platen, a sensor for determining the time at which a document passes the sensor position, and a motor controller for controlling the stepper motors, whereby the trail edge of a first document is advanced by the nip rolls and wide friction belt platen transport a selected distance past the sensor, the lead edge of a second document is subsequently advanced by the nip rolls to a selected registration position with respect to the trail edge of the first document, and the wide friction belt platen transport advances the now-registered documents simultaneously to a copying position, for sequential scanning of the documents, and advanced the documents to an output when copying is completed. Alternatively, while the first documents is at the first registration position, the second document may be advanced at constant speed towards a registration position with respect the first document. The first document is then accelerated by the wide friction belt platen transport to a constant speed, during which acceleration, the second document reaches a registration position with respect to said first document. Both documents are then advanced by the wide friction belt platen transport to copying position, and to an output when copying is completed.

In accordance with yet another aspect of the invention, a recirculating document handler is provided for advancing a first document to a first registration position with respect to the platen, a second document to a second registration position with respect to said first document position, and simultaneously moving first and second documents to a copying position for scanning of each document, and subsequent to copying, returning both documents to an input.

It is accordingly an outstanding object of the invention to provide an automatic document feeder suitable for use in simplex-to-duplex style copying, and allowing automatic placement of two documents on a platen simultaneously for sequential copying thereof.

It is another object of the present invention to provide an arrangement which allows registration of two documents simultaneously placed on a platen for sequential scanning of each document.

It is still another object of the present invention to provide an recirculating document feeder suitable for use in simplex-to-duplex style copying, using a copying process entailing the placement of two documents on the platen simultaneously for sequential copying, and returning the documents to the input tray.

These and other objects and advantages will become apparent as the following description is reviewed in conjunction with the accompanying drawings in which.

Figure 1:
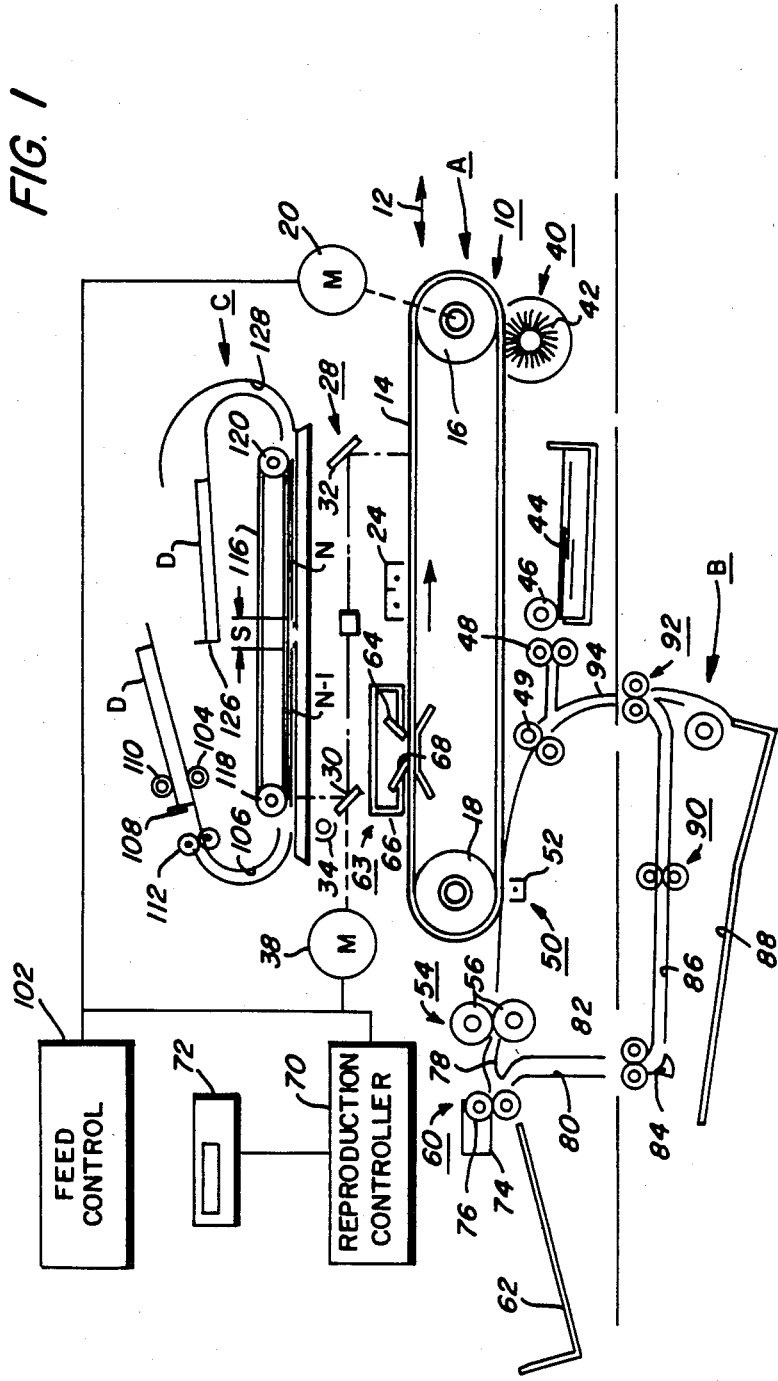
FIG. 1 shows a somewhat schematic view of the copy sheet and document paths as copy sheets and documents are passed through the processing stations of a reproduction machine, duplex module and inventive document feeder.

Referring now to the drawings, wherein the showings are for the purpose of illustrating a preferred embodiment of the invention and not for the purpose of limiting same, FIG. 1 shows a small copier system with which the present invention may have advantageous use. FIG. 1 shows the paper and copy sheet paths and operational stations of a somewhat standard reproduction processor A, in conjunction with duplex module B, and the inventive document feeder C, The reproducing machine depicted in FIG. 1 illustrates the various components utilized therein for presenting original documents and producing copies therefrom. It should become evident from the following description that the invention described herein is equally well suited for use in a wide variety of processing systems including other reproduction systems of any size, and is not necessarily limited in application to the particular embodiment or embodiments shown herein.

Reproduction processor A, illustrated in FIG. 1, includes a belt like photoreceptor member 14, the outer periphery of which is coated with a suitable photoconductive material. Belt 14 is mounted for movement about driven transport rolls 16 and 18, and travels in the direction indicated by the arrow on the inner run of the belt 14 to bring the image bearing surface thereon past the plurality of conventional xerographic processing stations. Suitable drive means such as motor 20 are provided to power and coordinate the motion of the various cooperating machine components whereby a faithful reproduction of the original input image information is recorded upon copy sheets such as a paper or the like.

Initially, photoreceptor 14 is passed through a charging station wherein photoreceptor 14 is uniformly charged with an electrostatic charge placed on the photoconductive surface by charge corotron 24 in a known manner preparatory to imaging. Thereafter photoreceptor 14 is exposed to the light from the input image whereby the charge is selectively dissipated in the light exposed regions to record the input image in the form of electrostatic latent image. A document or, documents D supported on platen 27 is scanned with a multi-mirror scanning optics system 28 schematically represented by the mirrors 30, 32, lamp 34 and lens 36 supported on carriages (not shown) and driven by servo motor 38 for controlled scanning movement. Multi-mirror scanning optics system 28 may typically be a 4 or 6 mirror arrangement of a type well known in the art, and providing controlled scanning of portions of platen 27 and accordingly, selectable scanning of documents placed thereon. Subsequent to imaging, the photoreceptor 14 passes through development station 40. A suitable development station could include a magnetic brush development system, including developer roll 42, utilizing a magnetizable developer mix having coarse magnetic carrier granules and toner colorant particles.

Blank copy sheets, which may be paper, plastic, etc. as desired, are supported in a stacked arrangement on elevated stack support tray 44. With the stack at its elevated position, the sheet separator segmented feed roll 46 feeds individual sheets therefrom to the registration pinch roll pair 48. The sheet is then forwarded through nip roll pair 49 to transfer station 50 in proper registration with the image on the belt 14, and the developed image on the photoconductive surface is brought into contact with copy sheet within the transfer station 50, and the toner image is transferred from the photoconductive surface of the photoreceptor belt 14 to the contacting side of the copy sheet by means of transfer corotron 52. Following transfer of the image, the copy sheet is separated from photoreceptor 14 by the beam strength of the copy sheet as it passes around the curved face of photoreceptor 14 around the transport roller 18; and the copy sheet supporting the toner image thereon is advanced through fixing station 54 wherein the transferred powder image is affixed to the copy sheet by passing the copy sheet through heated fuser roller nip 56. After fusing the toner image to the copy sheet, it is advanced to the reversible exit nip 60 from where it may be directed to sheet stacking tray 62 or to the input of a sorter, or directed to duplex module B.

Although a preponderance of toner is transferred to the copy sheet, invariably some residual toner remains on the photoconductive surface of photoreceptor belt 14 after the transfer of the toner image to the final support material or copy sheet. The residual toner particles remaining on the photoconductive surface after the transfer operation are removed from the belt 14 by the cleaning station 63 which comprises a cleaning blade 64 in scrapping contact with the outer periphery of the belt 14, and contained within cleaning housing 66 which has a cleaning seal 68 associated with the upstream opening of the cleaning housing. Alternatively, the toner particles may be mechanically cleaned from the photoconductive surface by a cleaning brush as is well known in the art.

When the copier is operated in the manual mode, original documents D to be reproduced are placed on platen 27 and scanned by multi-mirror scanning optics 28 which directs light from the document to the photoreceptor 14 for copying. The speed of photoreceptor 14 and scanning optics 28 are synchronized to provide for accurate reproduction of the document. Platen 27 is preferably large enough to support at least two $8\frac{1}{2} \times 11$ inch documents disposed on the platen with their long edges adjacent in spaced side-by-side relationship, and perpendicular to the plane of FIG. 1. Servo motor 38 drives scanning optics 28 in its motion by platen 27 and is controllable by reproduction processor controller 70 to selectively scan platen 27, whereby only a portion of the platen or a selected document on the platen is copied. Additionally, while in normal copying operation scanning optics 28 are moved along a path from a home position to a position required to complete exposure of a document to be copied, servo motor 38 is also controllable to provide repeated copying of such document, and returning scanning optics 28 to a "start scanning" position other than a normal home position for such copying. In this manner for example, a first portion of the platen supporting a first document may be scanned, and subsequently, the scanning optics may be moved to a second portion of the platen supporting a second document scanning.

Reproduction processor controller 70 is preferably a known programmable controller or combination of controllers, which conventionally controls all of the other machine steps and functions described herein and including the operation of the document feeder of the present invention, the paper path drives in both the reproduction processor A and duplex module B etc. As further described herein, the controller 70 also conventionally provides for storage and comparisons of counted values including copy sheet and documents, and numbers of desired copies, and control of operations selected by an operator through alphanumeric display and control 72.

Reversible exit nip 60 is provided with motor 74 for driving drive roller 76 in forward, reverse and stop motion. Motor 74 may advantageously be a stepper motor of the type well known in the art. Reproduction processor controller 70 instructs motor 74 to drive the drive roller 76 of exit nip 60 as required by the copying function in process. Thus, for simplex copying of a document, or completed duplex copying of a document, roller 76 is driven in a forward direction to drive copy sheet to output tray 62 thereby serving as an output driver. In the case where the copy sheet is required to receive a second side image for a duplex copy, roller 76 is driven first in a forward direction until the copy sheet trail edge has cleared passive deflector 78, and subsequently in reverse direction to drive the copy sheet back into reproduction processor A to be directed to the duplex module B. The process of changing direction while the copy sheet is in exit nip 60 serves to change the trail edge of the copy sheet to the lead edge to enable inversion of the document to receive a second side copy. In certain cases, it will be desired to hold a copy sheet while the processor advances previously returned copy sheets in order to correctly time the return of all the copy sheets to processor A for receiving a second image. In this case, roller 76 is stopped and the copy sheet is held between the rollers until a control signal is received from reproduction controller by the reversible exit nip motor 74, directing it to drive the paper in either forward or reverse motion.

Copy sheets to receive a second image thereon are passed downwardly from the passive deflector 78 along duplex module copy sheet path 80 to duplex module entry nip 82 which pass the copy sheet into the duplex module B. On passing duplex module entry nips 82, sheets are passed to duplex deflector baffle 84. Duplex deflector baffle 84 serves to direct copy sheets to either trayless path 86 or duplex tray 88. As described hereinbelow, when simplex to duplex copying with two documents on the platen is desired, the trayless path 86 is preferably used for optimum efficiency of the copying operation. Documents directed to the trayless path are advanced through trayless path 86, driven by trayless path nip 90, to duplex module exit nip 92, which returns copy sheets from trayless path 86 in duplex module B to reproduction processor A. The copy sheets enter reproduction processor A at reproduction processor entry 94, and are directed to nip rolls 49. It will be appreciated that the now-inverted copy sheets are thereby returned to the original copy sheet path in reproduction processor A to receive second side copy thereon.

It is believed that the foregoing general description is sufficient for the purposes of the present application to illustrate the general operation of an automatic xerographic copier which can embody the apparatus in accordance with the present invention. It will be appreciated that while the present invention finds particularly advantageous use with respect to the described arrangement, the principles of operation may be used in many other embodiments.

Figure 2:
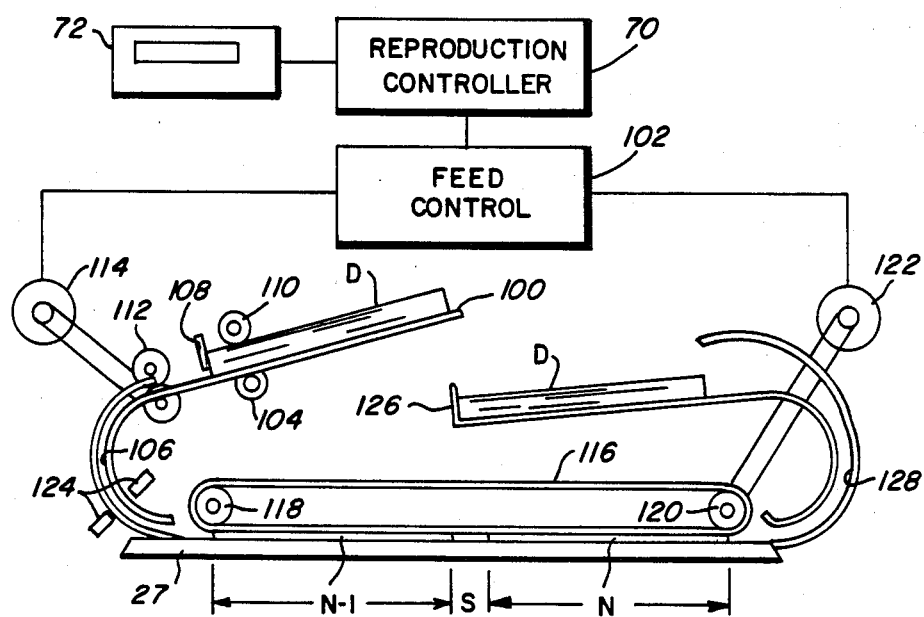
FIG. 2 is a somewhat schematic view of an automatic document handler in accordance with the present invention.

Referring now to FIG. 2, which best shows a document handler in accordance with the present invention, simplex documents to be copied to duplex copy sheets are stacked in input stack tray 100. When simplex to duplex style copying is selected by an operator at display 72, the feed control 102 is enabled. Feed control 102 is preferably a microprocessor controller of the type well known in the art, and may be advantageously be comprised of an Intel Model 8051 controller, which will control operations of the document feeder in accordance with a series of predetermined steps.

Documents in the input stack tray 100 may be stacked in a face up order, with the first document in the set on top of the set and facing upwardly, for $N-1$ document feeding. The last or Nth document of the set will be the lowermost document. The input stack tray 100 is advantageously provided with a bottom retard feeder 104, well known in the art, which feeds the Nth document out from the stack along document input path 106, while remaining documents in input stack tray 100 are held in place in the tray by stop 108 and normal force roller 110. As an alternative to an input stack tray, and well within the scope of the invention, a document input may be provided for insertion of single documents in a well known semi-automatic document feeding mode (SADF). A first document transport means is provided by locating a document feeder nip roll 112 driven by a first stepper motor 114 for engaging and advancing documents along the document input path. Document feeder nip roll set 112, driven by a first document feeder stepper motor 114 advances documents through document input path 106 to a second document transport means comprised of wide friction belt platen transport 116 entrained about transport rolls 118 and 120 and driven by a second document feeder stepper motor 122. First and second document feeder stepper motors 114 and 122 may advantageously be comprised of a stepper motor providing 200 steps per motor revolution, in 1.8° increments The document feeder motors may both driven by a common bipolar chopper drive (not shown) providing 1.5 amps per phase. Feed control 102 controls the chopper drive appropriately to operate the stepper motors. The document feeder stepper motors are controlled by a single drive to guarantee their synchronization. It will of course be appreciated that servo motors controlled in a similar manner would be acceptable for use in the inventive document feeder.

A document sensor 124 is provided along document input path 106 to detect the passage of selected edges of documents therepast. When sensor 124 detects, for example, a document passing thereby a signal is passed to the feed controller 102 indicating passage. The feed controller 102 will then provide control signals to first and second document feeder stepper motors 114 and 122 for a selected period of time to continue driving nip roll 112 and wide friction belt platen transport 116 to advance documents a corresponding distance to copying position. On completion of copying, the reproduction controller 70 signals the feed controller 102 to advance the documents to the output and recommence feeding form the bottom of the stack.

When simplex to duplex style copying with placement of two documents on the platen is desired, operator selection of such operation is selected at the display 72. First document (N) is fed from the bottom of the stack of documents in input stack tray 100 by bottom retard feeder 104 to document input path 106. First document feeder stepper motor 114 is enabled to drive nip roll 112 advancing the first document to wide friction belt platen transport 116. As the trail edge of the first document passes by sensor 124, second document feeder stepper motor 122 is enabled to drive wide belt friction transport 116 for a first selected period of time to advance the trail edge of the first document a corresponding distance to a selected position, which may be conveniently about 10 mm beyond sensor 124. The first document may be stopped at this position, which provides at least a portion of the first document in driving engagement with wide belt friction transport 116.

In the same manner, a second document (N−1) is fed from the bottom of the stack of documents in input stack tray 100 by bottom retard feeder 104 to document input path 106. First document feeder stepper motor 114 is enabled to drive nip roll 112 advancing the second document to wide friction belt platen transport 116. As the lead edge of the second document is moved past sensor 124, the first document feeder stepper motor 114 continues to drive nip roll 112 advancing the second document for a second selected period of time to advance the lead edge of the second document a corresponding distance, to a registration position with respect to the first document, thereby placing the documents in side-by-side closely spaced relationship a registration distance S apart. Second document feeder stepper motor 122 is then enabled to drive wide friction belt platen transport 116, advancing the registered documents to copying positions on platen 27 maintaining the registration distance S. In a preferred embodiment, two 8.5"×11" documents fed long edge first (LEF) may be spaced less than approximately 2 mm apart.

As previously described, the documents are sequentially scanned by multi-mirror scanning assembly 28. In an embodiment as described by U.S. patent application Ser. No. 814,827, the documents are sequentially scanned by scanning the first document twice in succession, and subsequently scanning the second document twice in succession. As described by the aforementioned patent application, during the interim time between first and second document scanning, copy sheets bearing first side copy from the first document, are passed through fuser 54 to reversible exit nip 60 and reversed to trayless path 86 in duplex module B, from where the first side copy sheets are returned to the reproduction processor A second side up and disposed to receive copy from the second document. On receiving second side copy on the second side of the copy sheet, the duplexed copy sheets are passed through reversible exit nip 60 to an output, such as for example, a sorter.

On completion of scanning the documents a selected number of times corresponding to a desired number of copies, the first and second documents are removed from platen by enabling second document feeder stepper motor 122 to drive wide friction belt platen transport 116, advancing the closely spaced documents to an output means such as output tray 126, through document output path 128.

In an alternative control scheme, the speed of document feeding may be increased. Rather than stopping the second document at its registration position with respect to the first document, the fact that the second stepper motor 122 requires a brief acceleration period is used. Accordingly, after the first document has been advanced to its registration position past sensor 124 with a portion of the first document in driving engagement with wide belt friction transport 116, first document feeder stepper motor 114 drives nip roll 112 to to advance the lead edge of the second document at a constant speed towards a registration position a distance S from the first document. When the lead edge of the second document passes sensor 124, second document feeder stepper motor 122 is enabled to drive wide friction belt platen transport 116, and accordingly, the first document. The second document continues advancing at a constant velocity, which velocity is greater than the velocity of the accelerating first document. Before the first document has been accelerated to a final constant speed, the second document reaches a registration position with respect to the first document. The two documents continue advancement to copying positions on the platen 27, advancing under the control of wide friction belt platen transport 116.

Figure 3:
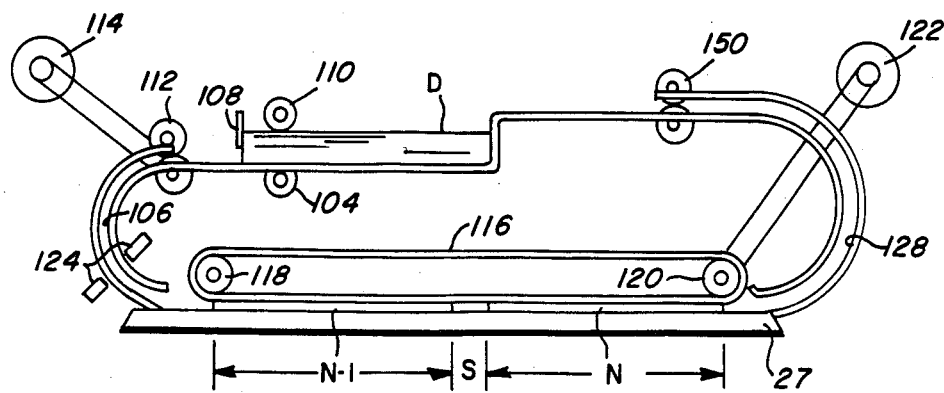
FIG. 3 is a somewhat schematic view of an recirculating document handler in accordance with the present invention.

In another alternative embodiment, as shown in FIG. 3, a recirculating document handler is provided with the same capability of placing two documents in spaced side-by-side relationship at copying positions on platen. Recirculating document handlers are used in precollation reproduction machines, to successively feed a plural document set across a copying platen and provide a complete collated copy set corresponding to each time the document set is fed across the platen. Accordingly, no further sorting of the copy sets is required after the set is produced. In accordance with this embodiment an embodiment generally similar to that described with respect to FIG. 2, is shown wherein the output means may include a nip roll set 150 to aid in the return of copied documents to document input tray 100 and the top of the original stack. For each set of copies desired, the plural document set is advanced through the document handler a corresponding number of times. It will be appreciated that recirculating document handlers, such as described in U.S. Pat. No. 4,468,114 to Pels et al and incorporated by reference herein, for example, are well known in the art of document handling, and may be comprised as described in that reference, and incorporating the described feeding and registration scheme of the present invention.

The invention has been described with reference to a preferred embodiment. Obviously, modifications will occur to others upon reading and understanding the specification taken together with the drawings. The described embodiments are only examples, and various alternatives, modifications, variations or improvements may be made by those skilled in the art from this teaching which are intended to be encompassed by the following claims.

We claim:

1. A document feeder adapted for use with a reproduction machine, for successively advancing to sequential copying positions on a copying platen of a reproduction machine two simplex documents to be copied to both sides of a single duplex copy sheet, said document feeder comprising:
    a document input for receiving documents to be copied;
    a document input feeder for feeding successive documents to be copied from said document input;
    first and second selectably controllable document transport means, said first document transport means for advancing documents fed from said document input, along a document input path, said second document transport document means for advancing documents from said document input path across a copying platen to selected copying positions and to an output means;
    sensor means for sensing the passage of documents in said document input path;
    control means for sequentially controlling said first and second document transport means to advance a first document to a first registration position a selected distance past said sensor member, said first document transport means to advance a second document to a registration position with respect to said first document position, said second document transport means to advance said first and second documents simultaneously to sequential, closely adjacent copying positions on a copying platen, and said second document transport means to advance said first and second document simultaneously to said output means.

2. A document feeder as defined in claim 1 wherein said document input includes an input tray for supporting documents for copying and said document input feeder feeds successive documents from said input tray.

3. A document feeder as defined in claim 2 wherein said input stack feeder feeds said successive documents from said input tray in an N to 1 order, and N is the lowermost document in the stack.

4. A document feeder as defined in claim 2, wherein said output means returns documents to said input tray.

5. A document feeder as defined in claim 1, wherein said first document transport means comprises nip roll means for advancing said documents along said document input path.

6. A document feeder as defined in claim 5, wherein said first document transport means further comprises a stepper motor for sequentially driving said nip roll means as controlled by said control means.

7. A document feeder as defined in claim 5, wherein said first document transport means further comprises a servo motor for sequentially driving said nip roll means as controlled by said control means.

8. A document feeder as defined in claim 1, wherein said second document transport means comprises a wide friction belt for advancing documents to sequential copying positions and to said output means.

9. A document feeder as defined in claim 8, wherein said second document transport means further comprises a stepper motor for driving said wide friction belt for advancing documents to sequential copying positions and to said output as controlled by said control means.

10. A document feeder as defined in claim 8, wherein said second document transport means further comprises a servo motor for driving said wide friction belt for advancing documents to sequential copying positions and to said output as controlled by said control means.

11. A method for advancing two simplex documents to copying positions for sequential copying in a reproduction machine, for making a desired number of duplex copies therefrom, comprising the steps;
    advancing a first simplex document to a selected registration position;
    advancing a second simplex document to a selected registration position closely adjacent to said first document; and
    advancing first and second documents simultaneously to a selected copying position for sequential copying thereof.

12. The method as defined in claim 11, and including the step:
    advancing said first and second documents to an output after a desired number of duplex copies have been made therefrom.

13. The method as defined in claim 11, and including the step:
    returning said first and second documents to the input stack after a desired number of duplex copies have been made therefrom.

14. A method of operating a document feeder for advancing first and second simplex documents from an input stack to sequential copying positions on an reproduction machine to produce duplex copies therefrom, said document feeder including input stack feeder means for feeding documents out from said input stack, first and second selectably operable document transport means, sensor means for sensing passage of documents thereby, and a document output means, said method comprising:
    operating said input stack feeder means to feed a first document from said stack to said first document transport means;
    driving said first and second document transport means for a selected time, whereby a trail edge of said first document is advanced to a predetermined position past said sensor;

operating said input stack feeder means to feed a second document from said stack to said first document transport means;

driving said first document transport means for a second selected time, whereby a lead edge of said second document is advanced to a position closely adjacent to said trail edge of said first document;

driving said second document transport means for a third selected time, whereby said first and second documents are advanced to predetermined sequential copying positions for sequential copying thereof;

driving said second document transport means to drive said documents to said output means.

15. A method of operating a document feeder for advancing first and second simplex documents from an input stack to sequential copying positions on an reproduction machine to produce duplex copies therefrom, said document feeder including input stack feeder means for feeding documents out from said input stack, first and second selectably operable document transport means, at least said second transport means having known acceleration time for accelerating documents from a stop position to a constant velocity, sensor means for sensing passage of documents thereby, and a document output means, said method comprising:

operating said input stack feeder means to feed a first document from said stack to said first document transport means;

driving said first and second document transport means for a selected time, whereby a trail edge of said first document is advanced to a predetermined stop position past said sensor;

operating said input stack feeder means to feed a second document from said stack to said first document transport means;

driving said first document transport means for a second selected time, whereby a lead edge of said second document is advanced at a constant velocity toward a position closely adjacent to said trail edge of said first document;

accelerating said second document transport means for a third selected time, to accelerate said first document from said stop position to said constant velocity whereby said second document reaches said position closely adjacent to said trail edge of said first document when said first document has substantially attained said constant velocity, whereupon both documents are advanced at said constant velocity to predetermined sequential copying positions for sequential copying thereof;

driving said second document transport means to drive said documents to said output means.

16. A method for recirculatively precollatively copying a set of plural original documents onto both sides of copy sheets to produce a desired number of precollated duplex copy sheets using a document handler means for advancing first and second simplex documents from an input stack to sequential copying positions on an reproduction machine, and returning said documents therefrom to said input stack, said document handler including input stack feeder means for feeding documents out from said input stack in an N−1 order, first and second selectably operable document transport means, at least said second transport means having known acceleration time for accelerating documents from a stop position to a constant velocity, sensor means for sensing passage of documents thereby, and a document output means returning said documents to the input stack, said method comprising;

operating said input stack feeder means to feed a first document from said stack to said first document transport means;

driving said first and second document transport means for a selected time, whereby a trail edge of said first document is advanced to a predetermined stop position past said sensor;

operating said input stack feeder means to feed a second document from said stack to said first document transport means;

driving said first document transport means for a second selected time, whereby a lead edge of said second document is advanced at a constant velocity toward a position closely adjacent to said trail edge of said first document;

accelerating said second document transport means for a third selected time, to accelerate said first document from said stop position to said constant velocity whereby said second document reaches said position closely adjacent to said trail edge of said first document when said first document has substantially attained said constant velocity, whereupon both documents are advanced at said constant velocity to predetermined sequential copying positions for sequential copying thereof;

driving said second document transport means to drive said documents to said output means, whereby said documents are returned to said input tray.

17. A method for recirculatively precollatively copying a set of plural original documents onto both sides of copy sheets to produce a desired number of precollated duplex copy sheets using a document handler means for advancing first and second simplex documents from an input stack to sequential copying positions on an reproduction machine, and returning said documents therefrom to said input stack, said document handler including input stack feeder means for feeding documents out from said input stack in an N−1 order, first and second selectably operable document transport means, at least said second transport means having known acceleration time for accelerating documents from a stop position to a constant velocity, sensor means for sensing passage of documents thereby, and a document output means returning said documents to the input stack, said method comprising:

operating said input stack feeder means to feed a first document from said stack to said first document transport means;

driving said first and second document transport means for a selected time, whereby a trail edge of said first document is advanced to a predetermined stop position past said sensor;

operating said input stack feeder means to feed a second document from said stack to said first document transport means;

driving said first document transport means for a second selected time, whereby a lead edge of said second document is advanced at a constant velocity toward a position closely adjacent to said trail edge of said first document;

accelerating said second document transport means for a third selected time, to accelerate said first document from said stop position to said constant velocity whereby said second document reaches said position closely adjacent to said trail edge of said first document when said first document has substantially attained said constant velocity, whereupon both documents are advanced at said constant velocity to predetermined sequential copying positions for sequential copying thereof;
driving said second document transport means to advance said first and second documents to said output means.

* * * * *